Oct. 15, 1968 H. B. LAW 3,406,068
PHOTOGRAPHIC METHODS OF MAKING ELECTRON-SENSITIVE
MOSAIC SCREENS
Filed July 30, 1951 2 Sheets-Sheet 2
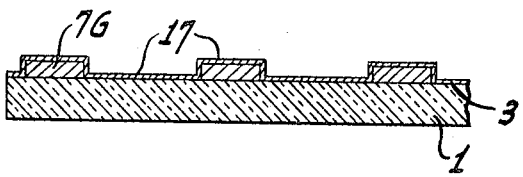
*Fig_5*
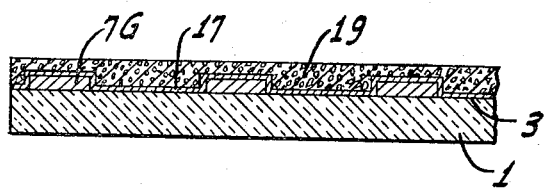
*Fig_6*
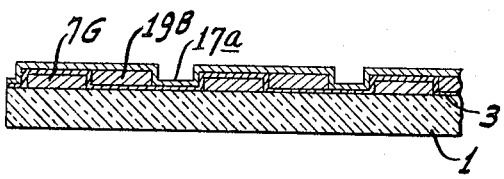
*Fig_7*
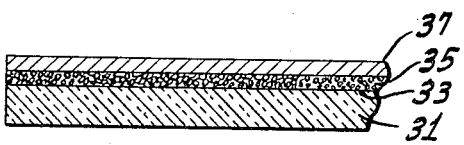
*Fig_8*
INVENTOR.
HAROLD B. LAW
BY
*Roderick Malcolm*
ATTORNEY United States Patent Office 3,406,068
Patented Oct. 15, 1968

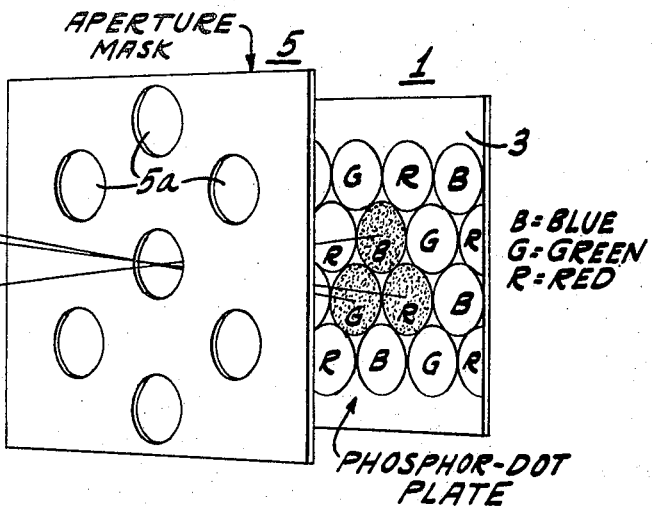
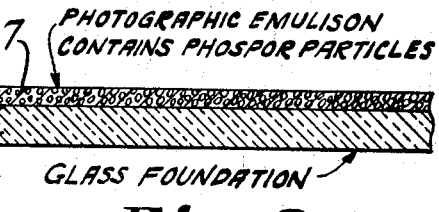
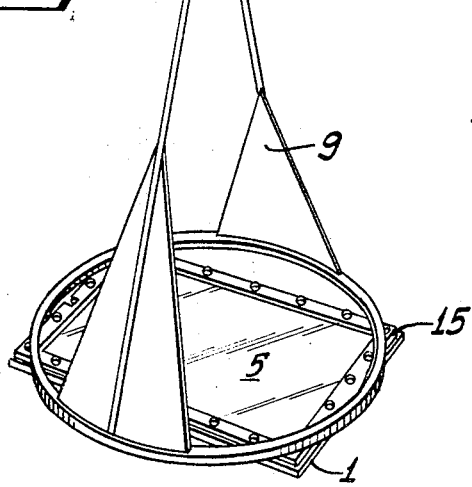
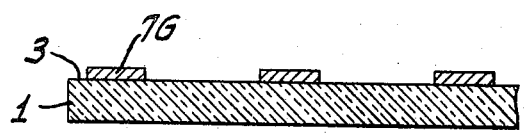

3,406,068
PHOTOGRAPHIC METHODS OF MAKING ELECTRON-SENSITIVE MOSAIC SCREENS
Harold B. Law, Princeton, N.J., assignor to Radio Corporation of America, a corporation of Delaware
Filed July 30, 1951, Ser. No. 239,358
21 Claims. (Cl. 96—36.1)

This invention relates to improvements in cathode-ray screens of the kind having a target surface made up of a multiplicity of discrete electron-sensitive areas, and has special reference to the provision of improvements in the art of making such "mosaic" screens.

The phosphor screens used in conventional "black and white" kinescopes, oscilloscopes, etc. are usually made by settling the phosphor on to a glass foundation surface from a liquid suspension. Because of the time element and alignment problems this method can not be employed, on a commercial scale, for laying down phosphors, or other ray-sensitive materials, upon the different elemental or sub-elemental areas of a mosaic screen (such, for example, as the tri-color "line" screen of Rudenberg, U.S. Patent 1,934,821 or the tri-color "dot" screen described in copending application of A. N. Goldsmith, Serial No. 762,175), now U.S. Patent 2,630,542. Usually such mosaic screens are made by the "silk-screen" process described and claimed by H. B. Law in copending application, Serial No. 158,901, now U.S. Patent 2,625,734.

In the Law silk-screen printing process the relative location of the numerous elements of the mosaic are plotted, photographically, and a gelatin or similar stencil is made by a photoengraving process from the photographic film or plate. The stencil is then mounted upon a "silk" (or metal gauze) screen and the color phosphors are laid down, one color at a time, upon the screen-plate through the openings in the fabric-supported stencil. Mosaic screens of a repetitive pattern made by the Law silk-screen process contain the impress of the stencil and, indeed, of the screen. This may give rise to disturbing optical moiré defects.

Accordingly, it is an object of the present invention to provide an improved ray-sensitive screen or target of the mosaic variety and one characterized by its substantial freedom from moiré and other optically disturbing defects.

Another and important object of the present invention is to provide a reliable yet simple method of making ray-sensitive targets of the mosaic variety and one which obviates the trouble and expense incident to the use of a "silk-screen."

The foregoing and related objects are achieved in accordance with the method of the invention by providing the target surface of a glass or other suitable foundation plate with a phosphor-containing photosensitive layer and by exposing said layer to light-rays having a pattern of distribution corresponding to the pattern of the electron-sensitive mosaic areas with which said surface is to be provided. The photosensitive material in which the phosphor is contained is subsequently removed so that only the phosphor materials remain upon said surface. An electron-permeable binder may be applied over the phosphor areas to hold them more firmly in position.

The phosphor particles may be added to the undeveloped emulsion either before or after it is applied to the plate and prior to exposing the same to light rays of a pattern corresponding to the pattern of distribution of the electron-sensitive areas with which the screen or target is to be endowed.

In one embodiment of the invention the target surface of the plate is coated evenly with phosphor particles in a silicate binder and dried. The dry coating is next coated with a photographic emulsion and then exposed to light rays of the desired pattern. The unexposed portions of the emulsion are then washed away and the underlying phosphor-binder layer is removed, as by a chemical process, thus leaving the desired array of emulsion covered phosphor areas on the foundation plate. In all of these embodiments of the invention, the emulsion covering or embedment is removed from the screen by baking, chemical dissolution or other appropriate means and the target surface of the screen is coated with an electron-permeable binder to secure the phosphors to said surface.

As will hereinafter more fully appear, the improved method of the invention lends itself readily to the manufacture of multi-color phosphor screens, as well as to the manufacture of so-called black-and-white screens of the mosaic variety.

The invention is described in greater detail in connection with the accompanying drawings wherein:

FIG. 1 is a partly diagrammatic view in perspective of a target assembly of a color-kinescope including a tri-color mosaic "dot" screen, made in accordance with the method of the present invention;

FIG. 2 is an end view of the glass foundation screen-plate of FIG. 1, showing its target surface coated with a phosphor-containing photographic emulsion during the initial stage of its manufacture;

FIG. 3 is a view in perspective of a "lighthouse" in which the emulsion covered plate of FIG. 2 is exposed to light-rays for the purpose of plotting the location of certain of the color-dots thereon;

FIG. 4 is an end view of the photosensitive screen-plate developed after its exposure to light-rays in the "lighthouse" of FIG. 3;

FIG. 5 is a similar view of the screen-plate showing its target surface coated with binding film prior to the application of a second-photosensitive-emulsion thereto;

FIG. 6 shows the screen-plate of FIG. 5 coated with a second phosphor-containing photosensitive emulsion;

FIG. 7 shows the screen-plate at a stage in its manufacture whereat excess emulsion has been removed, subsequent to a second exposure in the "lighthouse" of FIG. 3 and with its newly developed "dots" coated with a binding material;

FIG. 8 is an end view of a screen-plate which, in accordance with another embodiment of the invention, is first provided with an underlying layer of phosphor contained in a silicate binder and an outer layer constituted of a photographic emulsion.

The invention is herein described as applied to the manufacture of a tri-color television screen of the kind comprising a glass foundation plate 1 having a mosaic target surface 3 made up of a multiplicity (say, 600,000) of systematically arranged phosphor dots, R (red), B (blue), G (green). The particular dot-pattern shown in FIG. 1 is of the "hexagonal" variety disclosed in copending application of H. B. Law, Ser. No. 158,901 (U.S. Patent 2,625,734). Here each dot, except those adjacent to the edge of the plate, is surrounded by six other dots. Such screens have heretofore been used in conjunction with an apertured shadow mask 5 in color kinescopes of the so-called "masked target" variety. (As to this, see copending application of A. N. Goldsmith, Serial No. 762,175, now U.S. Patent 2,630,542.)

In such kinescopes the electrons pass through the apertures 5a in the mask 5 along separate angularly displaced paths r, b, g to the different color phosphors R, B and G, respectively. It will be observed that, as in the Goldsmith and Law disclosures, the mask 5 contains one hole for each "triad" or group of three phosphor dots and that each dot in each of the "triads" R, B and G is located at the terminal of the path of the beam ($r$, $b$ or $g$) which is allotted to its particular color.

In carrying the invention into effect, in accordance with one procedure, the bare glass foundation plate 1 is first placed in a pan or other vessel (not shown) containing a photographic emulsion such, for example, as photoengraver's fish glue, tung oil or an alkali solution of shellac and suitably sensitized as with potassium or ammonium bichromate. One of the phosphors, say the "green" phosphor, is then sifted either in a dry state, or sprayed on in an aqueous carrier, onto the surface of the emulsion and permitted to settle onto the surface of the emulsion-covered plate 1. The excess emulsion and phosphor are then drawn off and the phosphor-containing emulsion assumes the form of a coating 7 on the target surface 3 of the plate 1, as shown in FIG. 2.

The phosphor instead of being "settled" onto the plate 1 through the photographic emulsion as above described, may be mixed with the emulsion and applied over all the target surface 3 by a dipping, rolling or other suitable coating method. The quantity of phosphor employed, in either event, should ordinarily be of the order of 5 milligrams per square centimeter of target surface.

With the plate 1 thus treated, it is set-up beneath the apertured mask 5 in a "lighthouse" which may be similar to the one shown in the aforementioned Law application Serial No. 158,901, now Patent No. 2,625,734. This lighthouse comprises a pedestal or jig 9 that carries a small disc 11 containing 3 holes, $r'$, $b'$, $g'$ through any one of which light rays from a lamp 13 may be directed upon the emulsion covered plate 1 through the apertures in the mask 5. In this apparatus the distance between the mask 5 and the apertured disc 11 is the same as (or is a whole number multiple of) the distance between said mask and the "center-of-scan" of the tube in which the mask 5 and the screen 1 are to be used. (The "center-of-scan" is the plane or virtual plane in which the axis of each deflected beam, when extended rearwardly intersects the axis of origin of that beam.) Similarly, the spacing between the mask 5 and the screen plate 1, in the lighthouse 9, should correspond to the spacing of said parts in the finished tube. The latter spacing is maintained, as in the aforementioned Law application Serial No. 158,901, now Patent 2,625,734 by a spacer-frame 15.

With the disc 11 the shadow mask 5 and the photosensitive screen plate 1 arranged in the above described spaced relation, the lamp 13 is turned on so that its rays pass through the disc hole $g'$ (which in this case is alloted to the "green" beam G, FIG. 1) and thence through the mask 5 onto the plate 1, causing the emulsion 7 to harden where it has been exposed. The remaining or unhardened emulsion with its phosphor is washed off (with water, or, in the case of shellac emulsion, with alcohol), as part of the photographic development process. As shown in FIG. 4, this leaves dots 7G of emulsion mixed with (green) phosphor in the desired places on the target surface 3 of the screen plate 1.

As shown in FIG. 5, these green phosphor dots 7G are next provided with a thin coating 17 constituted of a binding material, such as potassium silicate, to cause them to adhere more firmly to the target surface 3 of the screen plate 1.

When, as in the instant case, the screen 1 is to contain dots of different color-emissive characteristics (e.g. red, blue and green) the target surface 3 of the screen plate is next re-coated with emulsion which has been mixed (as before) with a phosphor of the second color (e.g. blue) and the process is repeated, this time, however, making the lighthouse exposure from the second "gun position" (i.e. through the second aperture $b'$ in the disc 11, FIG. 2). FIG. 6 shows the second coating 19 of photosensitive emulsion, which will be understood to contain crystalline phosphor particles of the second color (i.e. "blue") applied all over the binder coating 17 on target surface 3 of the plate 1.

The entire process is again repeated for the third or "red" phosphor. FIG. 7 shows the plate 1 at a stage in its manufacture whereat the excess emulsion has been removed from the plate, leaving the second (or "blue") set of phosphor dots thereon. This group of dots 19B, like the first group (7G), is shown coated with a binder film 17$a$ of submicroscopic thinness.

After the third group of dots (R, FIG. 1) has been applied to the plate 1 the hardened emulsion, in all of the dots R, B and G, is removed as by baking (say, at a temperature of 400° C. for a period of about 1 hour) or by chemical dissolution, say by the application of a 5% solution of hydrogen peroxide and sodium carbonate, a 5% solution of sodium hypochlorite, or other suitable reagent. The screen plate is now ready for use, for example, in the kinescope-target assembly of FIG. 1.

The screen-manufacturing method described herein is susceptible of various modifications. By way of example, the glass foundation plate may be coated with a gelatinous photographic emulsion and exposed through an apertured mask 5 (FIG. 1) in the lighthouse of FIG. 2. The unexposed portions of the gelatin are then washed away leaving dots of gelatin in the desired array. An application of weak sodium-hydroxide operates to render the surface of the gelatin dots tacky. Phosphor particles of one color are then applied by dusting, settling or other appropriate means so that the phosphor adheres to the tacky surfaces of the gelatin "dots" and not to the bare glass. The phosphor covered dots are then covered with a protective coating such, for example, as a film of potassium silicate, and the plate recovered with emulsion. The foregoing steps of the method are then repeated, this time exposing the emulsion from the "second gun position" in the "light-house" and using the second color phosphor. The same method steps are repeated for the third color phosphor. After all the phosphors have been applied the remaining emulsion is removed, as in the first described method, by baking, chemical dissolution or other appropriate means, thus leaving only the dots of phosphors, in the desired pattern upon the target surface 3 of the foundation plate 1.

Referring now to FIG. 8: In another adaptation of the method of the invention the glass foundation plate, which is here designated 31, is first coated evenly, on its target surface 33, with a phosphor of one color, in a coating 35 of silicate binder and, when said coating 35 has dried, covered with a layer 37 of photographic emulsion. The coated surface of the plate is then exposed (through the disc 11 and apertured mask 5 in the lighthouse 9, FIG. 3) and the unexposed emulsion is washed away. Then that portion of the phosphor-containing binder 35 which is unprotected by the hardened emulsion is removed chemically (as by the use of one of the reagents previously mentioned) thus leaving the desired array of phosphor dots covered with emulsion. The plate is then coated with a phosphor of the second color (not shown) and the process repeated, making the lighthouse exposure from the second "gun position." The process is repeated for the third phosphor, leaving the desired pattern of phosphor dots covered with emulsion. Finally, the light-hardened emulsion is removed, as in the earlier described embodiments, by baking, chemical dissolution, or other appropriate process.

It need scarcely be pointed out that the invention is not limited in its useful application by the number or kinds of phosphors employed in manufacturing a particular screen. Thus, obviously, if a four-color screen is required, four discrete phosphor-emulsion coatings and four exposures are ordinarily employed. On the other hand, in making a mosaic screen of the black-and-white variety (see co-pending application of Nicoll et al., Serial No. 231,924) a single exposure is sufficient to impress the entire pattern of the mosaic upon the emulsion coated plate.

From the foregoing description of typical embodiments it will be apparent that the present invention simplifies the production of ray-sensitive screens of the mosaic variety and provides an improved screen, free from moiré and other defects ordinarily present in "printed" screens.

What is claimed is:

1. A method of manufacturing a cathode-ray tube comprising the steps of depositing on a screen-support of said tube a photosensitive substance, comprising an organic gel and a photosensitizing material, having a solubility which decreases with exposure thereof to light, and a first inorganic phosphor having a first given response characteristic upon impingement by electrons, selectively exposing spaced portions of said photosensitive substance to light, subjecting said photosensitive substance to a solvent whereby said photosensitive substance and said first phosphor are selectively removed in unexposed areas, depositing on said screen support and over the remaining portions of said first-deposited photosensitive substance a photosensitive substance, comprising an organic gel and a photosensitizing material, having a solubility which decreases with exposure thereof to light, and a second inorganic phosphor different from said first phosphor and having a second given response characteristic upon impingement by electrons, selectively exposing spaced portions of said second-deposited photosensitive substance to light, in areas offset from the previously exposed areas, subjecting said second-deposited photosensitive substance to a solvent whereby said second-deposited photosensitive substance and said second phosphor are selectively removed in unexposed areas thereof, and baking said screen support to remove said organic gel without removing said phosphors.

2. A method of manufacturing a cathode-ray tube comprising the steps of
    depositing on a screen support of said tube a water soluble photosensitive material, comprising an organic gel and a photosensitizing material, and a first inorganic fluorescent material having a first given color response upon impingement by electrons, said photosensitive material having a solubility which decreases with exposure thereof to light,
    selectively exposing spaced first portions of said photosensitive material to light to photochemically render them relatively water insoluble with respect to unexposed second portions thereof intermediate to said first portions,
    subjecting said photosensitive material to a water treatment whereby, and by reason of the difference in solubility of said first and second portions, said second portions are selectively dissolved,
    thereafter depositing on said screen support and over said first portions a water soluble photosensitive material and a second inorganic fluorescent material having a second given color response different from that of said first material upon impingement by electrons, said second-deposited photosensitive material having a solubility which decreases with exposure thereof to light,
    selectively exposing to light spaced first portions of said second-deposited photosensitive material in areas offset from the previously exposed first portions of said first-deposited photosensitive material to photochemically render said first portions of said second material relatively water insoluble with respect to second portions thereof intermediate to said last-mentioned spaced portions,
    subjecting said second-deposited photosensitive material to a water treatment whereby, and by reason of the difference in solubility of said first and second portions thereof, said second portions are selectively dissolved,
    thereafter depositing on said screen support and over said first portions of said first and second photosensitive materials a water soluble photosensitive material and a third inorganic fluorescent material having a third given color response different from that of said first and second fluorescent materials upon impingement by electrons,
    selectively exposing to light spaced first portions of said third photosensitive material in areas offset from from the previously exposed first portions of said first and second photosensitive materials to photochemically render first portions of said third photosensitive material relatively water insoluble with respect to intermediate second portions thereof,
    subjecting said third photosensitive material to a water treatment whereby, and by reason of the difference in solubility of said first and second portions of said third layer, said second portions are selectively dissolved,
    and baking said screen support to remove said organic gel without removing said inorganic fluorescent materials.

3. In a method of making a phosphor screen of the mosaic variety upon the target surface of a cathode-ray tube, the steps comprising:
    coating said target surface with a photosensitive material, the solubility of which is decreased by exposure to actinic energy and with inorganic phosphor particles which emit light in response to electron bombardment, said photosensitive material comprising an organic gel and a photosensitizing material,
    exposing said photosensitive material to actinic energy having a pattern of distribution corresponding to an array of elements of said mosaic so as to decrease its solubility in the exposed areas, thereby photographically recording said pattern upon said target surface,
    removing said phosphor particles and photosensitive material from only the unexposed areas of said target surface, by selectively dissolving said photosensitive material in said unexposed areas, and
    baking said target to remove said photosensitive material, but not said phosphor particles, from the exposed areas of the photographically recorded pattern on said target surface.

4. A method in accordance with claim 3 and wherein said phosphor particles are applied subsequent to the application of said photosensitive material to said target surface.

5. A method in accordance with claim 3 and wherein said phosphor particles are mixed with said photosensitive material prior to applying the same to said target surface.

6. A method in accordance with claim 3 and wherein said phosphor particles and a binder material are applied to said target surface prior to the application thereto of said photosensitive material.

7. In the manufacture of a cathode ray tube having a screen structure comprising a light transparent base and phosphors fixed thereto emissive of light of different colors in response to electron bombardment, a method of applying phosphors including the following steps: depositing a photosensitive layer having a solubility inversely proportional to exposure thereof to light and comprising an organic gel, a photosensitizing material adapted to vary the solubility of the gel, and inorganic phosphor particles emissive of light of one color; selectively exposing to light the areas of the deposited layer where said phosphor particles are to be retained, so as to render the layer in said areas relatively insoluble by a solvent capable of dissolving the unexposed areas of the layer; subjecting the layer to said solvent to dissolve the layer in the unexposed areas; depositing a second layer having a solubility inversely proportional to exposure thereof to light and comprising an organic gel, a photosensitizing material adapted to vary the solubility of the gel, and inorganic phosphor particles emissive of light of a different color than the first-mentioned particles; selectively exposing to light areas of said second layer offset in relation to the first-mentioned areas, so as to render the exposed areas of the second layer relatively insoluble by a solvent capable of dissolving the unexposed areas of the second layer; subjecting the second layer to the solvent to dissolve the layer in the unexposed areas; and subsequently baking the screen structure to remove the gel without affecting the inorganic phosphor particles.

8. A method according to claim 7, including the application of third light emissive phosphor particles by the following steps after subjection of the second layer to solvent and prior to the baking of the screen structure: depositing a third layer having a solubility inversely proportional to exposure thereof to light and comprising an organic gel, a photosensitive material adapted to vary the solubility of the gel, and inorganic phosphor particles emissive of light of a different color than the phosphor particles of the first two layers; selectively exposing to light areas of said third layer offset in relation to the aforementioned areas, so as to render the exposed areas of the third layer relatively insoluble by a solvent capable of dissolving the unexposed areas of the third layer; and subjecting the third layer to the solvent to dissolve the layer in the unexposed areas.

9. A method according to claim 7, wherein each of the photosensitive layers is a water soluble layer whose solubility decreases with exposure to light, and wherein the solvent employed for each layer is water.

10. The method of preparing a tri-color television screen including the steps of
   applying to a surface a film of a solvent-dispersible, light-sensitized colloid, comprising an organic gel and a photosensitizing material, which film is rendered non-dispersible in said solvent by exposure to light, and a first inorganic phosphor which emits light of a first color in response to electron bombardment,
   exposing designated areas of said film to light,
   washing said surface in said solvent to remove the film and the first phosphor from the unexposed areas of said surface,
   applying to said surface a further film of said light-sensitized colloid and a second inorganic phosphor which emits light of a second color in response to electron bombardment,
   exposing previously unexposed designated areas of said further film to light in areas offset from said first-exposed areas,
   washing said surface in said solvent to remove the film and second phosphor from unexposed areas of said surface,
   applying to said surface a still further film of said light-sensitized colloid and a third inorganic phosphor which emits light of a third color in response to electron bombardment,
   exposing previously unexposed designated areas of said still further film to light, in areas offset from said previously exposed areas,
   washing said surface in said solvent to remove the film and third phosphor from unexposed areas of said surface,
   and baking said surface to remove the remaining film, leaving behind said first, second and third phosphors.

11. In a method for making a phosphor screen of the type having first and second arrays of discrete areas of phosphor particles of different light-emitting properties interleaved in the form of a mosaic pattern, the steps for producing such a mosaic pattern including:
   depositing on a screen support a binder for said first phosphor particles comprising a photosensitizing material and an organic gel the solubility of which decreases with exposure to actinic energy;
   associating with said binder first inorganic phosphor particles emissive of light of a first color in response to electron bombardment;
   selectively exposing to actinic energy areas of the deposited binder so as to decrease its solubility in exposed areas, thereby producing areas of greater and lesser solubility;
   dissolving the unexposed areas of said binder, leaving undissolved binder in exposed areas to define on said support a first array of such discrete areas;
   depositing on said screen support a binder for said second phosphor particles comprising a photosensitizing material and an organic gel the solubility of which decreases with exposure to actinic energy;
   associating with said second-mentioned binder second inorganic phosphor particles emissive of light of a second color in response to electron bombardment;
   selectively exposing to actinic energy areas of said second-deposited binder offset in relation to the first-exposed areas so as to decrease its solubility in exposed areas, thereby producing areas of greater and lesser solubility;
   dissolving the unexposed areas of said second-deposited binder, leaving undissolved binder in exposed areas to define on said support a second array of such discrete areas offset from said first array; and
   baking said screen support to remove the remaining binder, leaving on said screen support a mosaic pattern of inorganic phosphor particles having different light-emitting properties under electron bombardment.

12. In the manufacture of a phosphor screen of the mosaic type, a method comprising:
   (1) forming, on a screen support, a first array of mosaic elements, each comprising photosensitive material capable of serving as a temporary phosphor binder and inorganic phosphor particles emissive of light of a first color in response to electron bombardment, positioned in a first pattern on said support, said pattern being established by:
      (a) depositing on said support a photosensitive layer comprising an organic gel and a photosensitizing material, said layer having a solubility adapted to be decreased by exposure thereof to light;
      (b) associating with said organic gel inorganic phosphor particles emissive of light of a first color in response to electron bombardment;
      (c) selectively exposing said photosensitive layer to light in areas constituting said first pattern, so as to render the layer in said exposed areas relatively insoluble by a solvent capable of dissolving the unexposed areas of the layer; and
      (d) subjecting the photosensitive layer, after exposure, to a solvent to dissolve selectively the unexposed areas of said layer;
   (2) subsequently forming, on said support, a second array of mosaic elements, each comprising photosensitive material capable of serving as a temporary phosphor binder and inorganic phosphor particles emissive of light of a second color in response to electron bombardment, positioned in a second pattern offset from said first pattern, said second pattern being established by:
      (a) depositing on said support a photosensitive layer comprising an organic gel and a photosensitizing material, said layer having a solubility adapted to be decreased by exposure thereof to light;
      (b) associating with said last-mentioned organic gel inorganic phosphor particles emissive of light of a second color in response to electron bombardment;
      (c) selectively exposing said photosensitive layer on said support to light in areas offset from said first pattern of areas, so as to render the layer in said exposed areas relatively insoluble by a solvent capable of dissolving the unexposed areas of the layer; and
      (d) subjecting said photosensitive layer, after exposure, to a solvent to dissolve selectively the unexposed areas of said layer; and
   (3) subsequently baking said screen support to remove the organic gel without removing the phosphor particles.

13. In the manufacture of a phosphor screen of the mosaic type, said screen comprising a support having thereon at least two arrays of phosphor deposits, each array comprising a different phosphor, the method of forming said arrays comprising:
  providing on said support a photosensitive material the solubility of which is decreased by exposure to actinic energy and inorganic phosphor particles emissive of light of a first color in response to electron bombardment, said photosensitive material comprising an organic gel and a photosensitizing material;
  selectively exposing to actinic energy areas of the photosensitive material so as to decrease its solubility in the exposed areas, thereby producing areas of greater and lesser solubility;
  subjecting said photosensitive material to a solvent to dissolve selectively the unexposed areas thereof;
  providing on said support a photosensitive material whose solubility is decreased by exposure to actinic energy and inorganic phosphor particles emissive of light of a second color different from the first, in response to electron bombardment, said photosensitive material comprising an organic gel and a photosensitizing material;
  selectively exposing to actinic energy areas of said second-provided photosensitive material offset in relation to the first-exposed areas so as to decrease its solubility in exposed areas, thereby producing areas of greater and lesser solubility;
  subjecting said second-provided photosensitive material to a solvent to dissolve selectively the unexposed areas thereof;
  and baking said support to remove the organic gel without removing the inorganic phosphor particles;
  whereby to establish, in offset areas of said support, patterns of phosphors emissive of light of different colors.

14. A method according to claim 13 in which the phosphor particles emissive of light of different colors are provided on said support simultaneously with the providing of their associated photosensitive material thereon.

15. A method according to claim 13 in which the phosphor particles emissive of light of different colors are provided on said support subsequent to the providing thereon of their associated photosensitive material.

16. A method according to claim 13 in which, after providing photosensitive material on said support, the phosphor particles emissive of light of different colors are applied in a dry state onto the surface of said photosensitive material.

17. In the manufacture of a phosphor screen of the mosaic type, said screen comprising a support having thereon at least two arrays of phosphor deposits, each array comprising a different phosphor, the method of forming said arrays comprising:
  applying to said support a first layer of photosensitive material the solubility of which decreases with exposure thereof to actinic energy, comprising an organic gel and a photosensitizing material;
  associating with said photosensitive material inorganic phosphor particles emissive of light of a first color in response to electron bombardment;
  selectively exposing to actinic energy areas of said layer, so as to decrease its solubility in the exposed areas, thereby producing areas of greater and lesser solubility;
  subjecting the layer to a solvent so as to dissolve its unexposed areas but to leave its exposed areas;
  subsequently applying to said support a second layer of photosensitive material the solubility of which decreases with exposure thereof to actinic energy, comprising an organic gel and a photosensitizing material;
  associating with said last-mentioned photosensitive material inorganic phosphor particles emissive of light of a second color in response to electron bombardment;
  selectively exposing to actinic energy areas of said second layer offset from the first-exposed areas of said first layer, thereby producing areas of greater and lesser solubility;
  subjecting the second layer to a solvent so as to dissolve its unexposed areas but to leave its exposed areas;
  and baking said support to remove the organic gel without removing the inorganic phosphor particles;
  whereby to establish, in offset areas of said screen support, patterns of phosphors emissive of light of different colors.

18. A method according to claim 17 in which the phosphor particles emissive of light of different colors are associated with their photosensitive material at the time said photosensitive material is applied to said support.

19. A method according to claim 17 in which the phosphor particles emissive of light of different colors are associated with their photosensitive material subsequent to the time when said photosensitive material is applied to said support.

20. A method according to claim 17 in which the phosphor particles emissive of light of different colors are associated with their photosensitive material by applying said phosphor particles in a dry state onto the surface of said photosensitive material while said photosensitive material is in contact with said support.

21. In the manufacture of a cathode-ray tube of the type comprising a phosphor screen support having, on a target face thereof, a mosaic phosphor screen including at least two arrays of phosphor deposits, each array comprising a different phosphor, said arrays being of substantially similar patterns offset from each other, a multi-apertured electrode disposed adjacent to said screen, and means for projecting electrons along different paths passing through the apertures of said electrode and onto said phosphor deposits of said screen, the method of establishing said patterns including the steps of:
  (1) sensitizing the target face of said phosphor screen support by coating said face with an organic gel and a photosensitizing material, said organic gel having a solubility which decreases with exposure thereof to actinic energy;
  (2) associating inorganic phosphor particles with said organic gel, said phosphor particles being emissive of light of a first color in response to electron bombardment;
  (3) positioning a multi-apertured mask in the same position relative to said phosphor screen support that the multi-apertured electrode of the finished tube will have;
  (4) projecting actinic energy through apertures in said thus-positioned mask and onto areas of said target face of said phosphor screen support from a first point, after said target face has been sensitized, to record directly on said phosphor screen support, the image of said apertures, thereby establishing thereon one of said patterns for one such array of phosphor deposits of said mosaic screen;
  (5) dissolving the unexposed areas of said coating of organic gel by applying a solvent thereto;
  (6) resensitizing said target face of said support by coating said face with organic gel and photosensitizing material;
  (7) associating inorganic phosphor particles with said last-mentioned organic gel, said phosphor particles being emissive of light of a second color in response to electron bombardment;
  (8) projecting actinic energy through said mask and onto areas of said target face of said phosphor screen support, after said target face has been resensitized, from a second point displaced from said first point, with said mask in the same position relative to said phosphor screen support that the multi-apertured electrode of the finished tube will have, to record directly on said phosphor screen support the image of said apertures, thereby establishing thereon another of said patterns for another such array of phosphor deposits of said mosaic screen, offset from said first-mentioned pattern;

(9) dissolving the unexposed areas of said last-applied coating of organic gel by applying a solvent thereto;

(10) and baking said target face to remove the organic gel but not the inorganic phosphor particles.

References Cited

UNITED STATES PATENTS

| | | | |
|---|---|---|---|
| 2,061,182 | 11/1936 | Zeller | 95—2 |
| 2,206,054 | 7/1940 | Sease | 95—2 |
| 2,332,038 | 10/1943 | Wynd et al. | 95—8 |
| 2,409,162 | 10/1946 | Staud | 95—8 |
| 2,435,889 | 2/1948 | Kerridge | 95—5.6 |
| 2,568,448 | 9/1951 | Hensen. | |
| 2,625,734 | 1/1953 | Law | 95—81 X |
| 2,446,915 | 8/1948 | Filmer | 95—5.6 |
| 1,805,361 | 5/1931 | Dufay | 95—81.5 |
| 1,605,062 | 11/1926 | Powrie | 95—2 |
| 1,161,731 | 11/1915 | Rheinberg | 95—81.5 |

OTHER REFERENCES

Leistner, "Photographic Engineering," vol. 1, No. 1, January 1950, pp. 7–15 (pp. 10–11 particularly cited).

Wall, "History of Three-Color Photography," American Photographic Publishing Company, Boston (1925), pp. 456–457; 483–486.

NORMAN G. TORCHIN, *Primary Examiner.*